(12) United States Patent
Immonen et al.

(10) Patent No.: US 9,094,414 B2
(45) Date of Patent: Jul. 28, 2015

(54) ARRANGEMENT AND METHOD FOR ANONYMOUS USER PROFILING AND TARGETED CONTENT PROVISION

(71) Applicant: GLOME OY, Helsinki (FI)

(72) Inventors: Edvard Immonen, Helsinki (FI); Sakari Kyro, Kuopio (FI); Timo Ronkainen, Helsinki (FI); Jerry Jalava, Riihimaki (FI); Esa Lipiainen, Helsinki (FI)

(73) Assignee: GLOME OY, Helsinki (FI)

( * ) Notice: Subject to any disclaimer, the term of this patent is extended or adjusted under 35 U.S.C. 154(b) by 0 days.

(21) Appl. No.: 13/974,438

(22) Filed: Aug. 23, 2013

(65) Prior Publication Data

US 2014/0059647 A1 Feb. 27, 2014

(30) Foreign Application Priority Data

Aug. 23, 2012 (GB) .................................. 1215017.3

(51) Int. Cl.
*H04L 29/06* (2006.01)
*G06F 17/30* (2006.01)

(52) U.S. Cl.
CPC .............. *H04L 63/102* (2013.01); *H04L 63/08* (2013.01); *G06F 17/30876* (2013.01)

(58) Field of Classification Search
CPC ... H04L 67/22; H04L 63/102; H04L 63/0421; G06F 17/30876
USPC .......................................................... 726/3
See application file for complete search history.

(56) References Cited

U.S. PATENT DOCUMENTS

| | | | |
|---|---|---|---|
| 2001/0036224 A1 | 11/2001 | Demello et al. | |
| 2002/0157026 A1* | 10/2002 | Brown | 713/202 |
| 2003/0080997 A1 | 5/2003 | Fuehren et al. | |
| 2005/0038698 A1* | 2/2005 | Lukose et al. | 705/14 |
| 2005/0198151 A1 | 9/2005 | Thorson | |
| 2007/0287453 A1* | 12/2007 | Wang | 455/435.1 |
| 2008/0270417 A1* | 10/2008 | Roker | 707/10 |
| 2009/0106300 A1 | 4/2009 | Brown | |
| 2011/0137730 A1* | 6/2011 | McCarney et al. | 705/14.58 |
| 2012/0054440 A1* | 3/2012 | Doig et al. | 711/122 |
| 2012/0203639 A1 | 8/2012 | Webster et al. | |

OTHER PUBLICATIONS

GB Search Report, dated Dec. 20, 2012, from corresponding GB application.

* cited by examiner

*Primary Examiner* — Hadi Armouche
*Assistant Examiner* — Bryan Wright
(74) *Attorney, Agent, or Firm* — Young & Thompson

(57) ABSTRACT

An electronic arrangement includes a computer device that provides a media profile entity configured to store and maintain at least one user-adjustable personal media profile for a user capable of accessing a network, and related sites, services and/or applications via a number of terminal devices, the personal media profile describing the user's interests preferably excluding identifiable information, the interests being represented on a number of levels including interest categories, and the interests are at least partially determined based on monitoring the user behavior relative to the network, and an authentication entity configured to associate a terminal utilized by the user with the media profile of the user based on profile-identifying data provided to/by the terminal.

28 Claims, 8 Drawing Sheets

512 ably including at least one network server optionally provided in a cloud environment and

ARRANGEMENT AND METHOD FOR ANONYMOUS USER PROFILING AND TARGETED CONTENT PROVISION

FIELD OF THE INVENTION

The present invention relates generally to computer and communication systems. In particular, however not exclusively, the invention pertains to network services and applications, user profiling, tracking, content provision, and related communication.

BACKGROUND

During the past few years online privacy has emerged as a trending topic that has raised remarkable concern amongst online users. Until recently, many users have sincerely believed that the interaction on the internet was taking place under full anonymity.

Now, the web (World Wide Web, WWW) users are finally becoming aware of the fact that a myriad of various entities, e.g. advertising companies, are more or less secretly, or 'behind the curtains', following their internet behavior including web 'surfing' and also gathering related personal information whenever possible. As marketing clutter has, on the other hand, made traditional 'broadcast' type generic marketing in many cases rather ineffective, more sophisticated tracing of user interests and habits has been considered necessary for catching the suitable audience for better targeted ads or other, optionally commercial, information.

Indeed, numerous web sites have been adapted to track visitors through different online tracking technologies, such as web bugs and cookies, which are able to trace, store and forward information about the users' online activity such as visited pages and performed 'clicks' or other actions. And not only the operating party behind the web site visited, but also third party entities have implemented more general tracking technologies for gathering private and often sensitive information about the users visiting the web sites that have been supplied with user tracking means. Such information, which may even contain name, address data, e-mail, browsing history, search terms/results etc., may be then ruthlessly capitalized for different marketing purposes, such as provision of targeted advertising, including unsolicited e-mails, also known as 'spamming', and e.g. various pop-up or web page— integrated but dynamically changing ads, which the users often consider annoying.

As a countermeasure, this situation has led to the development of different kinds of ad-blockers, i.e. content filtering (software) tools. Nevertheless, the problem with most ad-blockers is that the user, simply by activating the ad-block functionality, basically prevents all the present tracking means from gathering information, whereupon even the companies that may really attract and benefit the user are not able to targetedly approach the user anymore. As a potential further feature though, the user might be enabled to choose which tracking means are allowed to obtain data through the user interface of the particular ad-block application in use, but then again, the user may need to know which company is using which tracking means and at the same time many tracking means may be used simultaneously by several companies and the user may not want to share information with all of them, whereupon the such manual tailoring turns out easily extremely challenging or practically impossible at least with currently available tools. Additionally, many users just don't feel comfortable with sharing any private information, but still want to interact with different service providers.

SUMMARY

The objective is to at least alleviate one or more problems described hereinabove not yet satisfactorily solved by the known arrangements, and to provide a feasible solution for anonymous, user-controllable information sharing and online profiling, and a related means for third party entities to approach online users with content.

The aforesaid objective is achieved by the embodiments of an arrangement, a method, and a number of entities in accordance with the present invention. The presented solution may be applied for establishing and maintaining secure anonymous user profiles towards a number of remote applications and services, e.g. web sites, and offering targeted content without storing or only with limited user-controlled storage of user identifying elements. The accessed web sites and various other target entities may be prevented from obtaining identifiable information about the user.

Accordingly, in one aspect of the present invention an electronic arrangement, prefer one or more client devices like computers or mobile terminals, comprises a media profile entity configured to store and maintain at least one user-adjustable personal media profile for a user capable of accessing a network, optionally the web, and related sites, services and/or applications via a number of terminal devices, wherein the personal media profile describes the user's interests preferably excluding identifiable information, optionally at least name and/or e-mail, and wherein the interests are represented on a number of levels including interest categories, such as automotive or travel categories, and further wherein the interests are at least partially determined based on monitoring the user behavior relative to the network such as the web, an authentication entity configured to associate a terminal utilized by the user with the media profile of the user based on profile-identifying data provided to and/or by the terminal, such as a numeric or alphanumeric, optionally encrypted, code, said data preferably being substantially anonymous data, and a media control entity configured to allow and block online tracking and content provision, such as advertising, in accordance with the personal media profile, such as the user interests and potential settings maintained therewith, wherein the user is provided with a number of notifications indicative of content suggestions conforming to the personal media profile via the terminal, and wherein personal media profile data is selectively, preferably user-controllably, transferred between the personal media profile and an external entity, such as a web site, accessed in order to exchange user interests-describing data between these such that the external entity lacks direct access to the full personal media profile of the user.

The arrangement may comprise a terminal application such as a web browser extension/add-on or a dedicated application in addition to a preferred remote service entity optionally operated by a plurality of servers potentially in a cloud environment as mentioned above. Status (active/passive etc.) of the application may be visually indicated e.g. as an icon on the browser tool bar. The terminal application may exchange data with the remote service entity for profiling, authentication and/or media control/provision purposes. Optionally, the terminal application may be configured to obtain predetermined local data such as sensor data or data indicative of local application usage at the terminal and forward it to the service entity. Preferably the media profiles and related information such as user preferences are long-term stored and e.g. at least computationally more exhaustive behavior analysis/profiling and/or notification logic located at the remote service entity.

In one embodiment, the data exchange between a user terminal and a web site or other remote third party service/application entity is at least partially performed utilizing an intermediate, preferably service/application-specific, entity such as a virtual profile entity and/or proxy to anonymize the user towards such remote entity. The intermediate entity, being at least a logical entity, may be hosted by the arrangement and be dynamically established e.g. upon accessing the site/service for the first time. It may expire on session basis or based on an expiration condition such as expiration time, e.g. day, week, or month, since a reference instant such as the creation thereof or last access. The exchanged data may indicate user behavior and/or interests. Additionally or alternatively, data transfer between the terminal and server(s) of the arrangement itself may take place via at least logical intermediate entity such as a proxy.

In another, either supplementary or alternative, embodiment, a notification of a content suggestion may indicate at least one element selected from the group consisting of: product information, service information, a link to a service, a link to a web site, advertisement, offer, event, internet event, and real-life event such as a fair, sports event, or a concert.

In a further, either supplementary or alternative, embodiment, the applied categorization follows or includes at least part of a predetermined classification of economic activity, optionally North American Standard Industrial Classification System (NAICS).

In a further, either supplementary or alternative, embodiment, the authentication entity comprises logic such as terminal logic, e.g. terminal software or portion thereof, optionally browser software like browser add-on, for receiving data input such as code input as provided by the user via the UI (user interface) of the terminal, and optionally transmitting it as such or in modified form to a remote node such as remote server belonging to the arrangement for linking the terminal with the media profile associated with the data. The terminal logic may be configured to store the data as such or in modified, e.g. encrypted form, for future use during subsequent dynamic linkage actions.

Optionally, the terminal may further comprise local protection or authentication means on the UI/(terminal) device level. Such authentication may be device-specific and incorporate either hardware and/or software solutions such as a device PIN, access code, login to computer or a third party authentication solution such as Browser ID™, Facebook authentication etc. The (unanonymous) authentication may comprise a fingerprint, a retinal scan or some other biometrical data or a combination of said methods. This level of protection is preferably only for controlling the access to the (terminal) UI of the suggested solution, and the related authentication data is not shown to or accessed by the arrangement and e.g. authentication entity thereof in order to protect the user's privacy in terms of user profiling and content provision.

Still in a further, either supplementary or alternative, embodiment, the arrangement may be configured to provide a service UI such as a web site through which a user may access his/her personal media profile. Advantageously, the user may visually inspect the profile data such as user interests automatically and/or manually (by the user himself/herself) associated with him/her and preferably alter the data such as reduce the relevance of an interest category or increase the personal relevance of an interest category. The relevance may be indicated by a predetermined scheme such as a numerical range where higher number may imply more interest than a lower number towards the associated interest category. The numerical range may in some embodiments comprise also negative numbers expressing dislike. Further the numerical range may comprise non-integer numbers. In some embodiments, the user may independently switch the delivery of content and/or user profiling on/off per interest type such as interest category. Alternatively or additionally, the arrangement may automatically switch interests on/off based on profiling information.

Yet in a further, either supplementary or alternative, embodiment, a multi-level approach may be adopted by the arrangement for user interest modeling and tracking. For example, a higher level may contain more general categories according to the adopted categorization scheme, such as Automotive, Travel, Healthcare, Financial Services, Fashion, Sports, Computers, Telecom, and Entertainment. Each category may then include a number of more specific elements, or 'tags', more precisely indicating the interests falling under the category. For example, in Automotive category elements such as Parts, Maintenance, Sale, Purchase, and different brands like BMW or Ford could be indicated. As with categories, the tags could be associated with independent relevancy indicia. User interest data may be optionally shared between the users via the arrangement.

In a further, either supplementary or alternative, embodiment, the arrangement may be configured to maintain the user's personal media profile indicative of e.g. user interests updated through a number of automated tracking and related profiling tasks. At least one element may be selected for such tracking and profiling purpose from the group consisting of: visited web sites/pages, activated links or other objects ('clicks'), utilized search criteria such as search terms, messages written, messages received, ratings or votes given, time used with a web site/page, time used with a service, social contacts, group memberships, message senders, and message recipients.

The arrangement may then, on the basis of the tracked elements, update the profile. For example, data regarding the topic of visited web sites/pages, activated/selected objects, and the nature of provided feedback (votes etc.) may be analyzed according to predetermined logic such as applicable text analysis and classification logic and converted into user interest data hosted by the profile, for example.

Yet in a further, either supplementary or alternative, embodiment, a basic, or 'default', set of profile data elements may be determined that is initially available to third parties such as web sites and services. Optionally, the user may adjust preferably web site or service—specifically the information he/she is willing to share with the particular third party entity in question. The arrangement may maintain web site/service-specific settings for the purpose.

In a further, either supplementary or alternative, embodiment the arrangement is configured to control the visual representation of a notification such that it is shown, e.g. as a window or other visually distinguishable entity such as a frame within a window, substantially at a border area of a display/window or other UI/output device with dimensions occupying less than half, preferably less than third, more preferably less than fourth and most preferably less than fifth of the overall area available for data visualization within the display/window, further preferably for a limited time (i.e.

with automatic minimization even without explicit input by the user). Yet, additionally or alternatively the notification is preferably located such that the active area, e.g. the window relative to which the user is interacting with, and/or the area containing some information in contrast to e.g. blank areas are covered (hidden) by the notification as little as possible, potentially remaining completely visible. Positioning the notification may have a dynamic aspect, i.e. the location changes between the notifications or even regarding already-visualized notification depending on the aforesaid conditions (e.g. location of blank areas).

In a further, either supplementary or alternative, embodiment the notification may include an activable/selectable element such as a link for accessing the suggested, typically third party, content such as web site/page. The content may relate to an offer, such as product or service offer, deemed suitable according to the arrangement to the target user according to the profile information. Advantageously, the operator of the arrangement has made deals with trustworthy affiliates/advertisers (third parties) in order to provide profile-based content suggestions.

In a further, either supplementary or alternative, embodiment, profile data back-up may be enabled by linking it to a third party (authentication) service such as bank or credit card service, or a web service such as Browser ID™, Facebook™ connect or e.g. Twitter™. Alternatively or additionally, profile data may be backed up using hardware solutions such as memory stick or memory card.

In a further, either supplementary or alternative, embodiment, accepting the content indicated by the notification, such as visiting a suggested link and participating in a competition or event, e.g. car test drive, indicated by the linked web site/page, may be associated by the arrangement with a (virtual) reward such as money provided to the user (profile) in return. Further, the reward may be optionally turned into real funds as described in further detail hereinlater.

In another aspect, a method for user privacy—preserving profiling and content provision to be performed by an electronic arrangement preferably including at least one network server and/or a terminal device, comprises establishing a user-adjustable personal media profile for a web user capable of accessing a network, optionally the web, and related sites, services and/or applications via a number of terminal devices, wherein the personal media profile describes the user's interests preferably excluding identifiable information, optionally name and/or e-mail, and wherein the interests are represented on a number of levels including interest categories, such as automotive or travel categories, and further wherein the interests are at least partially determined based on monitoring the user behavior relative to the network, optionally the web, and controlling online tracking and content provision, such as advertising, in accordance with the personal media profile, such as the user interests and potential settings maintained therewith, wherein the user is provided with notifications indicative of content suggestions conforming to the personal media profile utilizing a terminal associated with the media profile, and wherein personal media profile data is selectively, preferably user-controllably, transferred between the personal media profile and external entity, optionally web site, accessed to exchange user interests-describing data between these such that the external entity lacks direct access to the full personal media profile of the user.

In one embodiment, the terminal is dynamically associated with the media profile of the user upon receipt of profile-identifying data from the terminal, such as a numeric or alphanumeric, optionally encrypted, code, said data preferably being substantially anonymous data.

The previously presented considerations concerning the various embodiments of the arrangement may be flexibly applied to the embodiments of the method mutatis mutandis as being appreciated by a skilled person.

The utility of the present invention arises from a plurality of issues depending on each particular embodiment. Firstly, the web use are able to share their interests instead of identity, e.g. name or e-mail address, with different services for obtaining optimized, personalized, user-controlled service experience. A single user may establish multiple anonymous (the level of anonymity may be controllable by the user) profiles. Preferably, however, to secure the user's anonymity, only one profile may be activated at any given time via a terminal device and the profiles may not be linked to each other by the arrangement.

Secondly, targeted content such as product and/or service offers may be provided to the profiled users by means of delicate, undisturbing notifications that are visible on the (terminal) device UI and/or audibly reproduced via a loudspeaker or buzzer/beeper thereof, for instance. The users may be associated with temporary intermediate elements with temporary e-mail addresses via which external parties may then limitedly (temporally limited, for instance) reach the user to provide the targeted content.

Further, profiling may take place completely automatically based on monitored user behavior and/or based on data received from external data sources, typically services such as social networking services, but the users may still preferably adapt and change the profile information via the associated service UI such as web UI and add new interests to their profiles or delete/alter the existing ones among other potential profile maintenance tasks. For example, in addition to or instead of more straightforward blocked/unblocked, or off/on, type switching of interests (e.g. predetermined categories or more specific instances of interests such as brands or certain products/services), finer resolution preference adjustment may be made possible via e.g. user-adjustable numerical value indicative of an interest's relative validity/importance to the user.

The established and maintained (updated) profiles can be generally utilized like personal loyalty cards. The profile is a representation of the user's interest to third parties (businesses, services, instances) to gain benefits like personalized service, better deals, money or any other reward or any combinations thereof. As a result, interaction between parties is on equal level and completely fair—business as it should always be. The users are thus provided with an opt-in way to receive personalized service and optionally save on the price of interesting apps/services (they may potentially purchase new apps/services with reward funds obtained from accessing the suggested content), while the different companies or other entities provided content to be notified to suitable users may enhance their business ethically.

No traditional sign in or sign up is mandatory to protect the user's identity. Terminal devices of a user may be dynamically connected to the desired profile by means of privacy-preserving authentication data such as numeric code originally determined upon profile creation.

User profiling in general and the resulting profiles could be coarsely divided into "who you are" and "what you are" classes. The present invention implements "what you are" type of concept, i.e. a description of one's interests without giving away identity. Each user may be thus considered as a media. Naturally the user may decide to voluntarily provide identity information such as name or e-mail address to certain services such as services suggested to him/her via notifications or other services he/she is previously familiar with (e.g. accredited financial services), but the user still retains the ultimate control which parties he/she trusts with his/her identity. The solution provided herein may preferably be, depending on the embodiment, disabled by the user regarding the selected web sites/services so that the user may access those without the arrangement's intervention or background monitoring.

The suggested solution may also be at least partially integrated with external services such as social media services such as Facebook™ and various (other) network services including UI-level integration. Solution-related UI elements may be added to the existing service UIs and necessary APIs may be constructed for data exchange. Client (terminal) side implementation of the logic for carrying out various embodiments of the present invention may be cleverly carried out by means of a browser extension or a dedicated terminal application regarding browser-accessible web services or other online services (accessed via dedicated client applications, for instance), respectively.

Additional benefits of different embodiments of the present invention will become clear to the reader on the basis of the following more detailed description.

The expression "a number of" refers herein to any positive integer starting from one (1), e.g. to one, two, or three.

The expressions "a plurality of" and "multiple" refer herein to any positive integer starting from two (2), e.g. to two, three, or four.

The numerals "first" and "second" are used herein to distinguish an element from another and not to prioritize or denote any particular order of the elements, unless explicitly stated otherwise.

A skilled reader will further realize that the terms "service" and "application" may in many instances utilized interchangeably as obviously e.g. a network service may be implemented by a network-connected application.

Different embodiments of the present invention are also disclosed in the dependent claims.

BRIEF DESCRIPTION OF THE RELATED DRAWINGS

Next the invention is described in more detail with reference to the appended drawings in which FIG. 1 represents a portion of an embodiment of a user profile constructed in accordance with the present invention and related taxonomy.

DETAILED DESCRIPTION OF THE EMBODIMENTS

Figure 1:
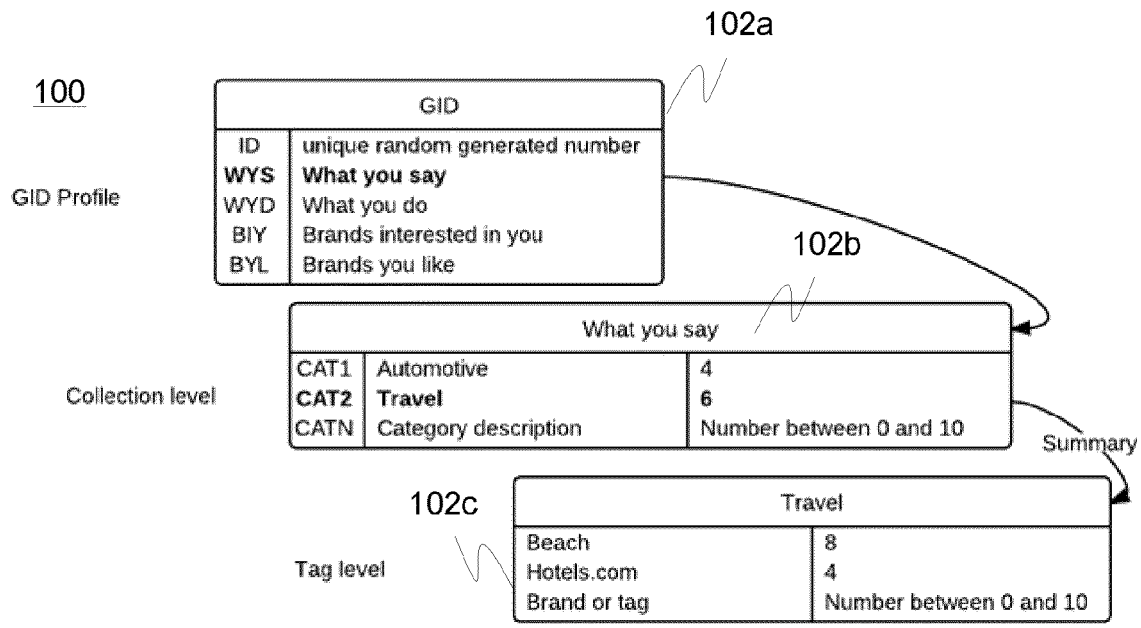

FIG. 1 illustrates, by way of example only, an embodiment of a user profile 100 that could be established and managed utilizing an embodiment of the present invention.

Preferably the constructed and maintained, i.e. updated to remain substantially current, profile 100 is anonymous, i.e. it characterizes and indicates the associated person's (user's) interests to enable tailored/targeted content control and provision, but omits personally identifiable information such as name or e-mail.

The profile 100 may indicate a plurality of (higher level) elements and/or categories 102a such as 'what you say', 'what you do', 'brands interested in you' and/or 'brands you like' regarding the user in question.

'What you say' 102b may be naturally considered an important element regarding the objective of representing one's interests. 'What you do' may indicate e.g. statistics of one's actions. 'Brands interested in you' may include a representation of the profiles of the brands the user attracts. 'Brands you like' may include a representation of the profiles of the brands the user would like to attract.

Interests 102b may be described as or categorized into a number of collections like 'automotive' and 'travel', and within those collections as more distinctive, or lower level, items 102c that may be called as 'tags' such as "BMW" representing, for example, car brands and/or models and "Beach" representing different aspects of travelling. These collections 102b and/or tags 102c may be valued utilizing a predetermined (numerical) range, such as a range extending from 0 to 10 implying e.g. extremely uninteresting or very interesting topics from the standpoint of the associated user, respectively. The predetermined numerical range may in some embodiments comprise negative numbers, wherein the negative numbers imply e.g. dislike. The predetermined numerical range may also in some embodiments comprise non-integer values. One individual may, in theory, have an unlimited amount of profiles to choose from and use.

By the solution offered by the present invention the users may controllably share information regarding their interests to third parties (businesses, services, instances) in order to gain benefits like personalized service, better deals, money or any other reward or combination thereof in return. The profile data may be captured and generated automatically by the arrangement but adjusted/tailored manually by the user, when necessary.

Figure 2:
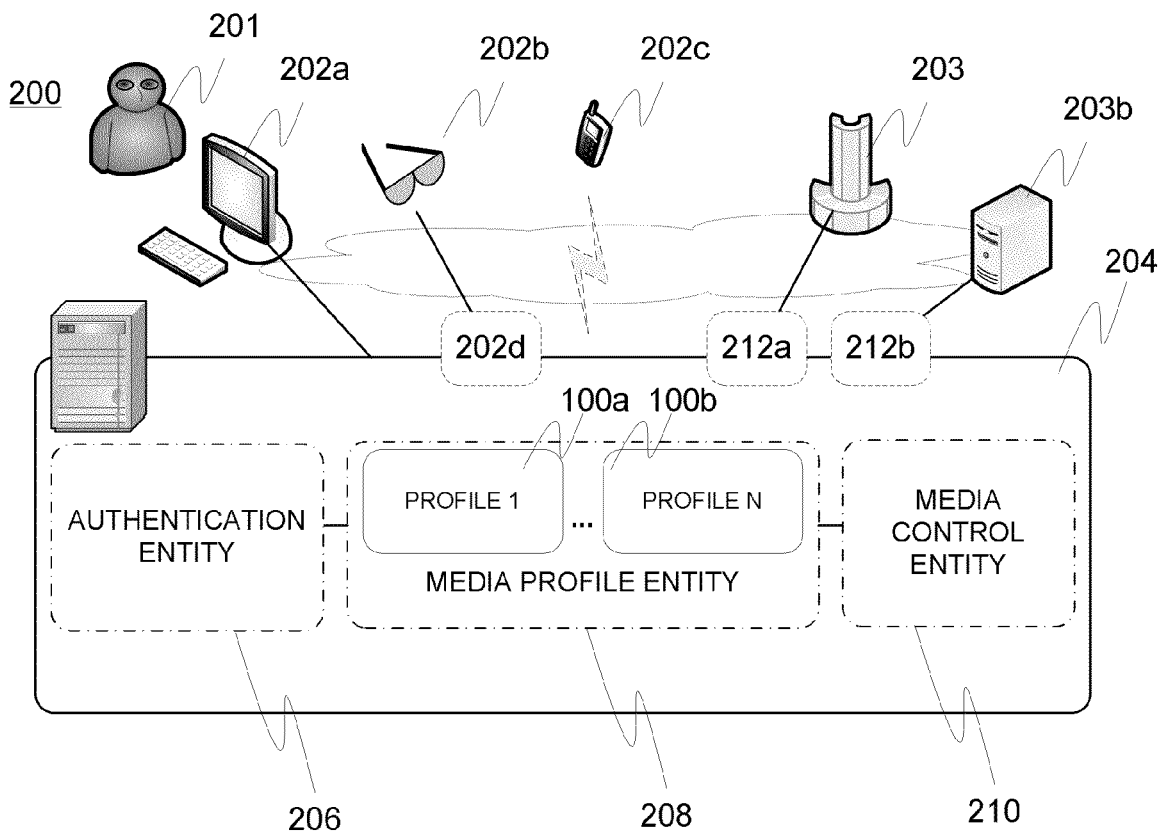
FIG. 2 is a sketch of an embodiment of an arrangement in accordance with the present invention.

FIG. 2 illustrates, at 200, an embodiment of an arrangement in accordance with the present invention with a conceptual approach.

Generally, any of the users 201 may utilize one or more client (terminal) devices 202a, 202b, 202c in the context of the present invention for a number of reasons such as accessing a desired network service/application, such as a web site.

Access may be generally realized using a (web) browser or a dedicated client application at the terminal 202a, 202b, 202c. For example, desktop or laptop computers 202a and mobile terminals, such as smartphones or tablets, 202c may be typically exploited for connecting, optionally via a number of communication networks, to an external target entity for obtaining needed information, reading/writing messages, taking part in e-commerce, etc. Further, more specific and/or limited devices such as 'smart' sun glasses, memory (e.g.USB) sticks, credit cards, or e.g. (car) keys 202b provided with integrated or at least functionally connected data transfer elements (e.g. wireless transceivers or transmitters) may be exploited for data provision as explained hereinafter. In addition to various other tasks, the devices 202a, 202b, 202c may be utilized in the context of the present invention for exchanging information with the arrangement 204 for profiling and related uses.

Various devices and systems communicating with the arrangement 204, such as devices 202a, 202b, 202c, may generally have session support, where a session implies the time when the device is active and collecting data (collecting comprises inputting data, copying data, transferring data and gathering data). The lifespan of a session may be set to start and to end within a timeframe and/or the occurring of a predetermined event. The timeframe may be predetermined by the user (max session length) or it may be set upon activation from the device. Examples of terminating events are return of device, push of a button, geolocation change, a command from a linked device, linking action to another profile or any other predetermined event.

The arrangement 204 may incorporate a computing entity such as a server or a plurality of servers optionally residing in a cloud for enabling flexible capacity allocation among other benefits. Optionally the arrangement 204 may be considered to include the aforesaid terminal(s) 202a, 202b 202c, or 'clients', that may be adapted to run specific terminal side software (application logic) such as a (web) browser extension or other application that may communicate with server(s) via a number of communication networks such as the internet and e.g. cellular network upon need, e.g. upon browser start-up and/or upon browsing actions (e.g. accessing a web page). It may be configured to indicate to the server the intended/taken terminal action(s) that the server may utilize for profiling, other analysis, ad/content blocking and allowing, and providing suggestions of potentially interesting content such as product offers from the standpoint of the concerned user.

Indeed, tasks and functionalities may be allocated between the network side (servers etc.) and terminal(s) in different ways depending on each embodiment as understood by skilled persons. In some embodiments, the terminal side may mostly act as a front-end of the arrangement to the user 201 taking care of data provision, collection and transfer, whereas the network (server) side deals with more complex and computationally potentially exhaustive modeling, analysis, content selection, etc.

In some embodiments, the network side (server) may control, e.g. by means of a proxy, most or substantially all web-related traffic such as web page requests and replies thereto (typically following HTTP, Hypertext Transfer Protocol) relative to the terminal, i.e. the traffic is conveyed to the terminal via it and processed/filtered, when applicable. Preferably the magnitude of such control may be user-adjusted e.g. web site or protocol—specifically. In some other embodiments, the traffic may be routed along standard paths and the arrangement controls the terminal side data transfer/representation cooperatively with the terminal-side application(s).

The arrangement 204 may at least logically be considered to include an authentication entity 206 that advantageously enables substantially anonymous, dynamic (real-time) pairing of a (terminal) device to a profile. In other words, the authentication procedure addresses a certain profile from a plurality of profiles for subsequent use with the device without necessarily requiring the user behind the profile and in control of the terminal to identify himself/herself.

The authentication entity 206 may exploit e.g. profile-associated code initially allocated upon establishing the profile or changed afterwards via the UI of the arrangement 204 for pointing out the profile to be activated. The user 201 may provide the code or other profile-identifying input via the UI, e.g. touchscreen, keyboard or keypad, of the terminal 202a, 202b, 202c.

The initial code for a new profile may be automatically created by a terminal application (e.g. browser add-on or dedicated application), for example, and associated with the profile to enable future addressing and thus accessing thereof.

In order to subsequently access the profile with a further terminal device, the original terminal application storing the code may be preferably instructed to export it (e.g. to a removable medium such as an USB stick) or display it so as to enable linking the further terminal device with the same profile. In other words, the exported/displayed code may be utilized in the further terminal to access the previously created profile and e.g. related data.

A media profile entity 208 may be configured to host the profiles 100a, 100b for different users 201 and update them based on the analysis of the received information (web usage, data from external services, etc.).

In some embodiments, the arrangement may be configured to import or export at least portion of a user profile to/from an external service such as Facebook™, Twitter™ or Google™. APIs such as Facebook Connect may be applied for implementing the associated data interfaces. Additionally or alternatively, the service account (media profile) may be linked with external account(s) such as the aforementioned accounts to enable backups, for instance.

A media control entity 210 may be configured to provide tailored content suggestions on the basis of the profile information, to generate statistics, and receive data from external services regarding the content options. Yet, the provision of content such as ads may be generally controlled such as filtered/blocked regarding e.g. the web sites and pages the user visits in according to the profile information. Further, online tracking may be controlled such as blocked by the media control entity 210. For instance, different web bugs and/or cookies may be disabled. Advantageously the user 201 may adapt his/her settings regarding blocking rules e.g. web site, web page and/or target entity (e.g. bug or cookie) specifically.

Therefore, the suggested solution generally provides a way to pair multiple devices together to enrich the data that is associated with the profile. As alluded above, the applicable client (terminal) devices may comprise mobile phones, tablets, computers, consoles, cameras and also non-screen devices such as keys, credit cards and USB sticks.

Conceptually, one may also divide the devices roughly into two classes, namely connectors and controllers. The devices with UIs supporting more versatile input (e.g. keyboard, touchscreen) such as mobile phones, computers, tablets that allow the user to access and control his/her profile may be used as controllers. With a controller, one may switch between different profiles on the UI level—one controller can be linked to many profiles but only one profile may preferably be active at any given time. These profiles may not be linked or connected together in any way, although they can be alternately used on the same device, for protecting the associated user's identity.

Devices such as TVs, digital book readers and personal or non-personal but more specific, or limited use, items 202b like car keys or 'smart' sunglasses that may be used for collecting and optionally displaying information, could also be used as data collectors for the arrangement 204. Collectors may advantageously have only one linked profile associated with them at any given time. Collectors may be linked to a proxy and/or other intermediate (at least logical) element 202d that collects and prepares the data to be sent to the associated profile. Collectors are thus linked to the profile by the proxy. There may be one or more proxies for a collector.

Still reverting to FIG. 2, as mentioned earlier the arrangement 204 may be and typically is configured to communicate with external services/applications 203, 203b such as web sites or other online services. The communication may take place through 'virtual profiles', proxies and/or other, at least logically, intermediate elements 212a, 212b like with the afore-explained collector devices so that the information sharing regarding the data contained in full user profile 100a, 100b may be fully controlled. The virtual profiles 212a, 212b may define the profile data that may be provided from the actual full profile 100a, 100b to each particular external service 203, 203b. The virtual profiles 212a, 212b may incorporate or be at least associated with temporary e-mail addresses through which the external service 203, 203b may reach the related user. Such addresses and basically also the virtual profiles 212a, 212b as such may be advantageously dynamically deleted based on e.g. predefined expiry time. Further, data from a service 203, 203b to another may be transferred utilizing virtual profiles. For instance, the user 201 may decide the share the profile (data) associated with a certain service to another service and optionally vice versa. Data received from an external service 203, 203b may be exploited for profiling, statistics, content suggestions, etc. The user may advantageously control the amount and nature of profile data 100a, 100b that is shared with external services service-specifically (e.g. the user may define sharing rules for each external service; default rules may be also be at least partially automatically determined by the arrangement 204).

In some embodiments, the external service/application 203, 203b may particularly refer to entertainment sector with reference to gaming. The arrangement 204 may be configured to transfer profile data to/from a game-related service or application. The game application may utilize the received profile for automatically tailoring in-game features such as the properties of a playable character and/or shown visuals such as ads. Likewise, the user actions relative to the game may be adapted to cultivate the profile hosted by the arrangement 204.

Figure 2B:
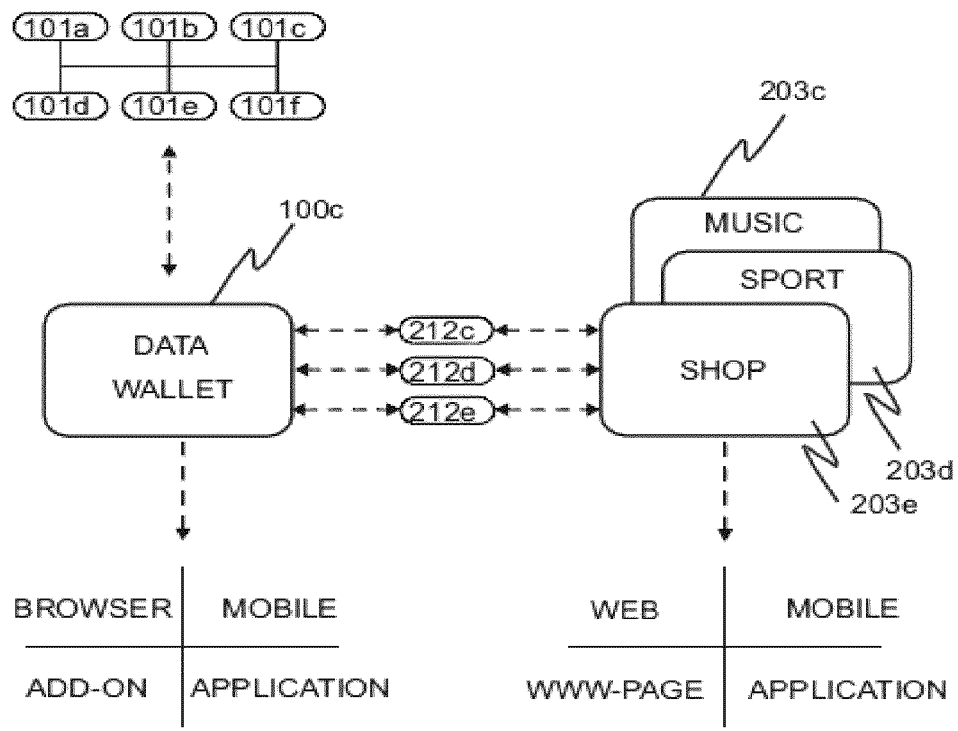
FIG. 2b is a sketch of an embodiment of a user data wallet configured to communicate with external services/applications.

FIG. 2b illustrates, still by way of example only, an embodiment of the present invention in a form of a digital data wallet 100c preferably implemented by or at least communicating with the aforesaid arrangement. The wallet 100c may incorporate or at least indicate user profile data such as the aforementioned media profile of the user, configured to communicate with different services/applications 203c, 203d, 203e. The digital data wallet 100c may therefore provide a representation of a user's recorded digital media-related behavior. A digital data wallet 100c may hence, for example, comprise a selection of topic-specific or category specific profiles 101a, 101b, 101c, 101d, 101e, 101f, which represent the user's interests/behavior related to/towards different topics or categories like 'digital footprint', 'likes and dislikes', 'entertainment profile', 'geo profile', 'sports profile' and/or 'shopping profile'.

'Digital footprint' 101a may indicate a user's digital behavior by collecting data regarding browsing and usage data across devices linked to the same digital data wallet 100c, for instance. 'Likes and dislikes' 101b may include a representation of a user's opinions towards different media across a network, typically the web, which media may for example be a video, photo, blog, website and/or other media that a user may express his/her opinion towards by simply 'clicking' a 'like' or 'dislike' button. An 'entertainment profile' 101c may indicate a user's interests towards i.e. music and/or TV programs. A 'geo profile' 101d on the other hand may indicate one's movement and location data. A 'sports profile' 101e may provide a representation of a user's activity and exercise customs, whereas a 'shopping profile' 101f may indicate a user's shopping behavior.

Generally, a multitude of different devices and related software programs are designed to gather digital user data. Hence, by connecting a user media profile/data wallet 100c to such services/applications 203c, 203d, 203e rather exact profiling may be effectuated. Besides, smart phones are equipped with different sensors and tracking means which are already utilized by i.e. different exercise applications by tracking the user's running pace, distance, etc.

A digital data wallet 100c may also contain other beneficial user related data. For instance, the data wallet 100c may contain data indicating one's importance/relevance towards a business/content provider, which data is preferably analyzed and evaluated on the basis of the user's activity, e.g. acceptance of content suggestions, which will be described in more detail herein later. The data wallet 100c may also contain data indicating one's earnings arising from accepting content suggestions, for instance. Furthermore, the data wallet 100c, may contain data indicating which services/applications and/or devices are connected/communicating to/with the data wallet 100c.

Still reverting to FIG. 2b, a user profile/data wallet 100c may be configured to communicate with services/applications 203c, 203d, 203e via a web browser or generally terminal application. For example, when a user communicates relative to a web site a temporary intermediate element 212c, 212d, 212e may be configured to provide a controllable communication platform between the web site and the data wallet 100c hence, preventing the web site to access the data wallet 100c automatically as a whole. The intermediate element 212c, 212d, 212e may i.e. provide only selected user information to the web site by providing one or a cluster, preferably not all, of the category specific profiles 101a, 101b, 101c, 101d, 101e, 101f from the data wallet 100c depending on the web site in question and/or a user's selections.

As another example, when a user accesses a desired mobile application on his/her mobile phone, wherein the application may establish network connections, transfer data, etc., the data wallet 100c is configured to communicate with the mobile application 203c, 203d, 203e via another dedicated client mobile application specifically designed for the data wallet 100c. Again, preferably, an intermediate element 212c, 212d, 212e is configured to provide a communication platform between the mobile application 203c, 203d, 203e and the data wallet 100c, hence preventing the mobile application 203c, 203d, 203e to access the data wallet 100c freely without any restrictions.

A data wallet 100c may be configured to communicate with several services/applications 203c, 203d, 203e substantially simultaneously. The data wallet 100c may be at the same time connected both to a web site(s) through a browser extension/add-on and a native mobile or generally terminal application(s) through a dedicated data wallet application. Preferably, the media wallet 100c is configured to communicate with different services/applications 203c, 203d, 203e via separate, dedicated intermediate elements 212c, 212d, 212e hence, protecting the user's identity.

As one secure communication enabler, the temporary intermediate element 212c, 212d, 212e may also provide a, preferably anonymous, platform for the exchange of messages between the user and the service/application 203c, 203d, 203e that is often, but not exclusively, represented by a business. A temporary message platform may follow or resemble that of chat, Twitter, e-mail, and/or basically any other applicable type of message exchange. In this sense, for example, the arrangement according to the invention may provide a platform for companies to carry out targeted marketing to customers without revealing the customer's identity. The arrangement according to the invention may provide a content provider/business with temporary e-mail addresses associated with users, which are correspondingly linked with the user profiles in the data wallet 100c. The e-mail address works as or together with an intermediate element 212c, 212d, 212e preventing the content provider/business access the data wallet 100c and hence, protecting the user's/customer's identity.

Figure 3:
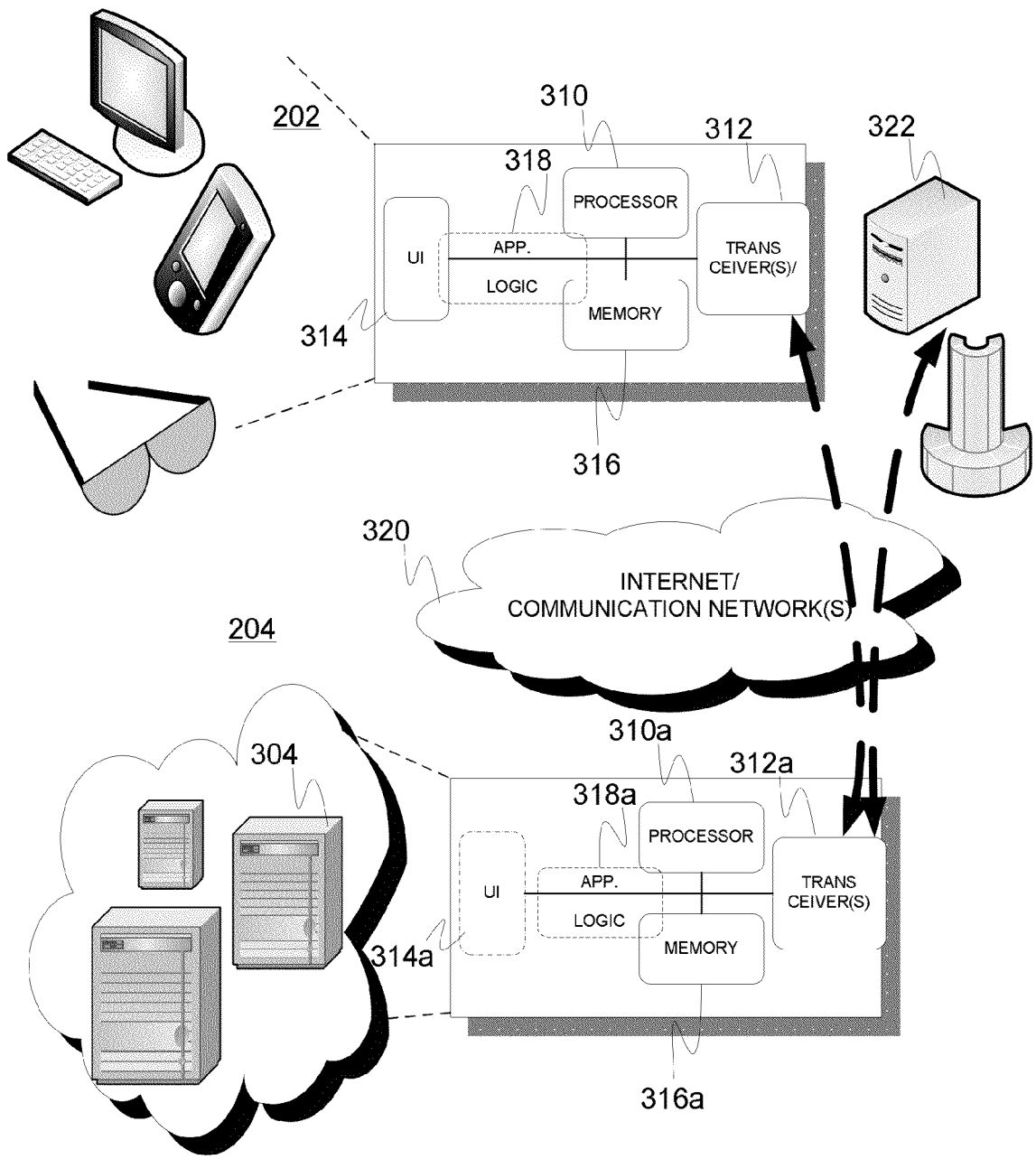
FIG. 3 is a block diagram representing the internals of an embodiment of the arrangement with emphasis on related hardware.

FIG. 3 is a block diagram representing the internals of an embodiment of the arrangement, such as the one of FIG. 2, with particular emphasis on the related hardware. Naturally, a server 304 or a similar computing apparatus may include a number of processing devices such as microprocessors, microcontrollers, DSPs (digital signal processor), programmable logic chips, etc. for executing instructions and processing data potentially stored in one or more memory elements such as memory chips 316a. In some embodiments, processing and memory entities may also be integrated. The instructions for performing authentication, maintaining and/or storing media profile data, or executing media control, for example, may be implemented as collections typically called as software application(s) 318a, for example. Optionally, software, or 'computer program product', may be transported and stored using a physical, tangible carrier medium such as a memory card, stick or optical disc, or be sent over a network over a wireless or wired medium.

UI 314a may refer to both local and remote UI for controlling the hardware of the server 304 itself and/or the executed software providing the media profiles and related features. Local UI may include e.g. a display or other data out-put/feedback device and mouse and keyboard for obtaining user input. Remote UI may be provided via a data transfer interface 312a such as a network interface, optionally Ethernet or other LAN (Local Area Network) interface, that enables connecting to external network(s) 320 including the internet so that the necessary communication with remote terminal devices 202 and different external entities like services/servers 322 may conveniently be effectuated. For example, a browser-based UI with e.g. HTTP and HTML (HyperText Markup Language) roots among other options may be used. In some embodiments, the arrangement is configured to provide a user with a 'home page' or generally user (account) information web page, or a plurality of related pages, or other personal data contemplation and/or management infrastructure.

The terminal device 202 for accessing the service provided by the remaining arrangement 204 generally includes corresponding elements such as processing entity 310, memory entity 316, at least one data transfer interface 312 such as a cellular and/or wired network (e.g. Ethernet or other LAN) interface, software logic 318 such as browser extension or stand-alone application for connecting the remote server 304 and UI 314 that may optionally include e.g. a touchscreen as being common with mobile terminals such as so-called 'smartphones' and tablet computers at the time of writing.

Figure 4:
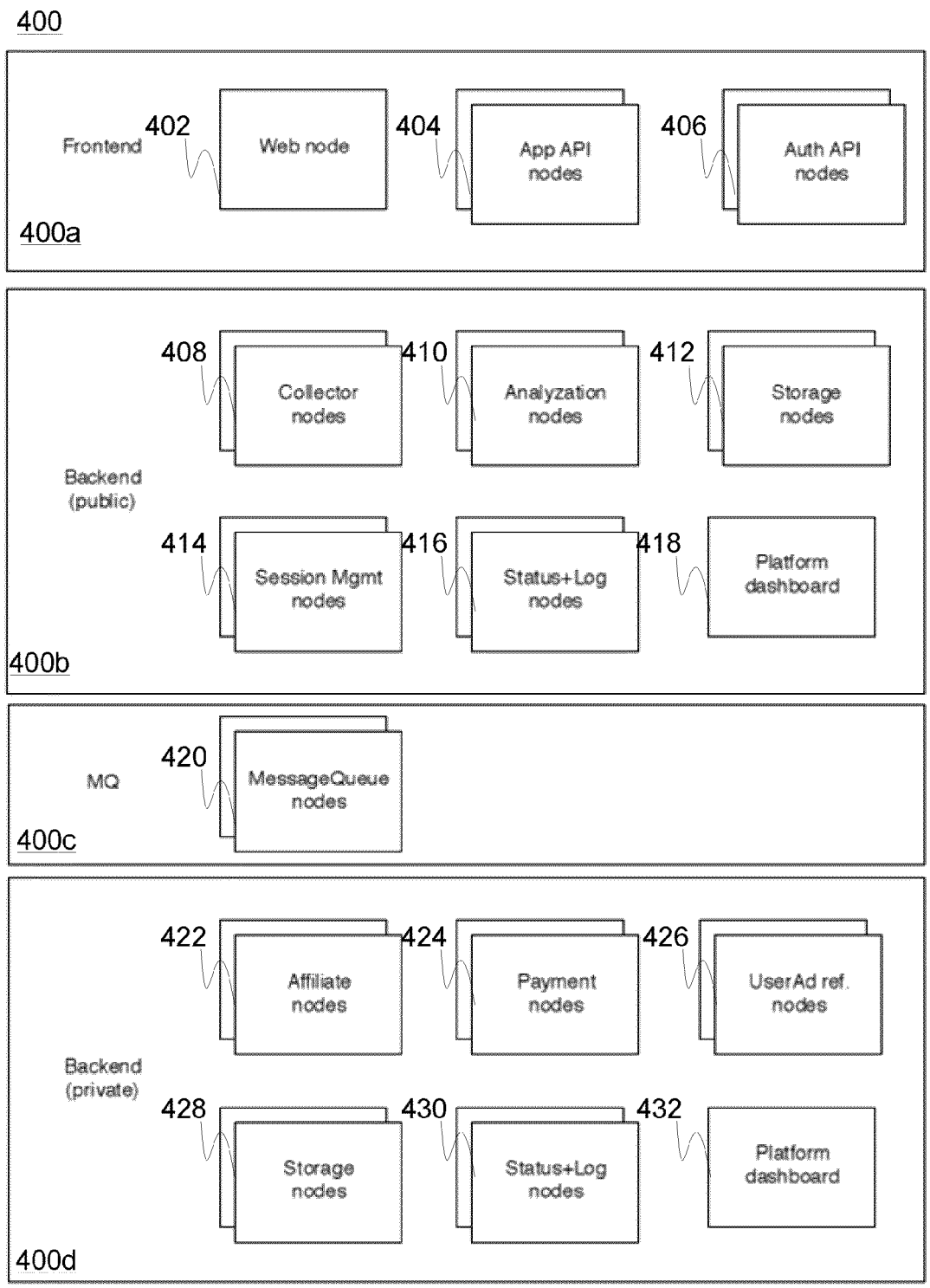
FIG. 4 is a high-level infrastructure representation of an embodiment of the present invention.

FIG. 4 discloses a merely exemplary high-level infrastructure representation 400 of an embodiment of the present invention essentially from a functional perspective to support the more conceptual and hardware-oriented representations of previous FIGS. 2 and 3, respectively.

Regarding the Front-end 400a, web node 402 represents e.g. a public web site server that may optionally be load balanced.

Item 404 refers to preferably load balanced instances of the public APIs (Application Programming Interface) used e.g. by browser extensions and application developers.

Item 406 refers to a number of preferably load balanced instances of public Authentication API service used by browser extensions and application developers. Switching over to the Backend block (public) 400b, collector nodes 408 represent instances of different data collectors. Their main purpose is data collection from different services such as Twitter™, Facebook™, etc. Also there can be collectors which are given data straight through the public API calls.

Analyzation nodes 410 are instances of different data analysis services, often created to pair with collectors. These can also be run outside the main network cluster, e.g. Amazon AWS (Amazon Web Services) for Hadoop™ clustering etc.

Storage nodes 412 represent public storage and memory cluster, e.g. database such as distributed Riak™ cluster and Redis™ instances.

Session management nodes 414 are preferably load balanced instances of session management handlers. For instance, Auth API 406 may utilize these to hand out session keys, identifiers, etc.

Status+Log nodes 416 are preferably load balanced instances of the public platforms monitoring and logging instances. Their job can be to monitor services in the public backend and receive log files/lines from different services.

Platform dashboard 418 is the monitoring server that is publicly available to view e.g. the overall status of the service platform.

Inside MQ block 400c, MessageQueue nodes 420 represent instances of MessageQueue service nodes. These are used to communicate between Public and Private backends. Also both public and private services can use these to do MQ between other services or themselves.

At the Backend (private) 400d, affiliate nodes 422 represent the instances of different affiliate handlers. Their main purpose is data collection and handling from different affiliate networks. They can also provide web interfaces for managing the data.

The payment nodes 424 provide a preferably load balanced service for payment handling, advantageously also managing the users' (service internal) wallets and their history.

UserAd ref. nodes 426 provide a service which keeps track of which ad to show and holds a history of ads displayed and their corresponding actions taken by the user.

Storage nodes 428 represent the private storage and memory cluster such as Riak™ cluster and Redis™ instances.

Status+Log nodes 430 are preferably load balanced instances of the private platforms monitoring and logging instances. Their main job is to monitor services in the private backend and receive log files/lines from different services. These may also receive information from public Status+Log service.

Platform dashboard 432 is the monitoring server used by the operator of the profile service/arrangement to track the status of the platform.

Figure 5A:
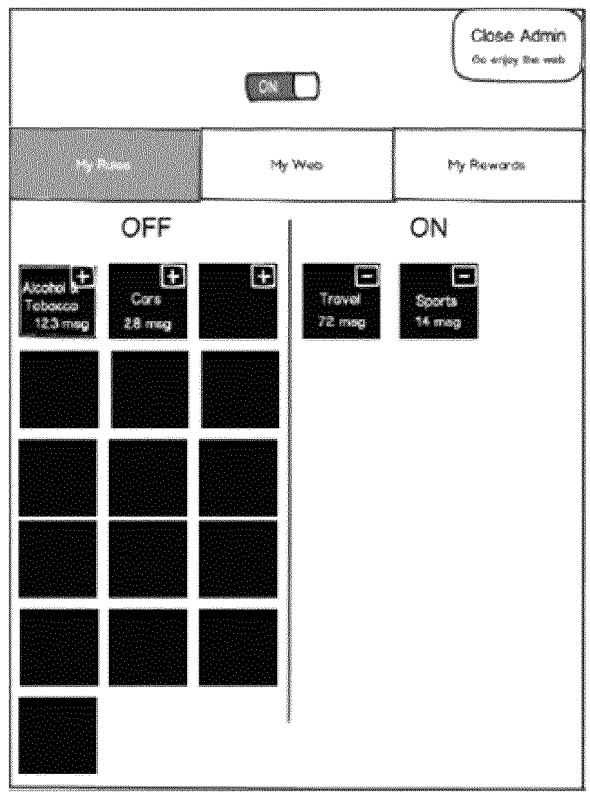
FIG. 5a is an example of a browser-based UI for accessing and controlling the arrangement in accordance with the present invention.

FIG. 5a is an example of a browser-based UI for accessing and controlling the arrangement in accordance with the present invention. The shown view 502 visualizes few controls for managing profile details such as adjusting interests information. The interests have been categorized into multiple categories such as Alcohol&Tobacco, Cars, Travel and Sports. The user is provided via the UI a possibility to alter the current profile/logic rules for related content provision under the active UI page or tab 'My Rules'. In the screenshot, the categories shown as rectangles on the left have been set off (blocked) and the categories shown on the right have been set on (allowed). Optionally the user may via a mouse or e.g. touchscreen type user input device move a category from 'off' location to 'on' location, or vice versa, by pointing at the target item and moving it to the target location, i.e. using so-called drag & drop method.

Figure 5B:
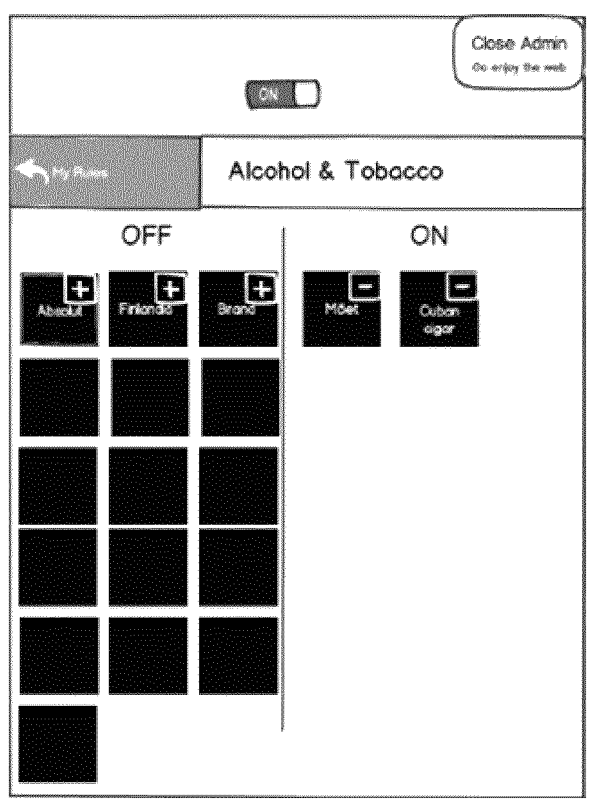
FIG. 5b is a further example of a browser-based UI and related view.

FIG. 5b is a further example of a browser-based UI and related view. This view 504 especially illustrates how the user may conveniently go into details of a higher level category, such as 'Alcohol & Tobacco', and within the category independently set off/on, i.e. block/allow, lower level items such as brand names or item types. Interests may be generally arranged into a structure containing a plurality of levels. In some embodiments, a higher level category could be generally blocked but some lower level items, such as few interesting brands in a generally uninteresting sector, be still allowed in terms of content delivery.

Figure 5C:
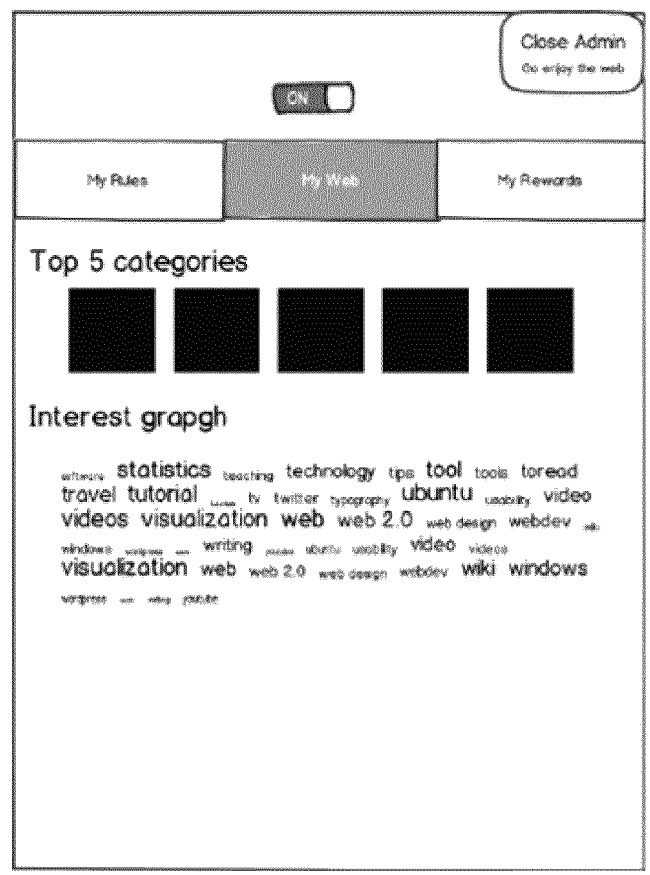
FIG. 5c is one more example of a browser-based UI and related view.

FIG. 5c is one more example of a browser-based UI and related view. The shown view 506 discloses statistical data such as 'Top categories' or 'Interest graph'. The arrangement may be configured to create such data indicative of user interests based on at least one tracked element selected from the group consisting of: search term, keyword, web site (visited, input or otherwise indicated), web page, web page category, web site category, message header, message topic, and message payload.

Figure 5D:
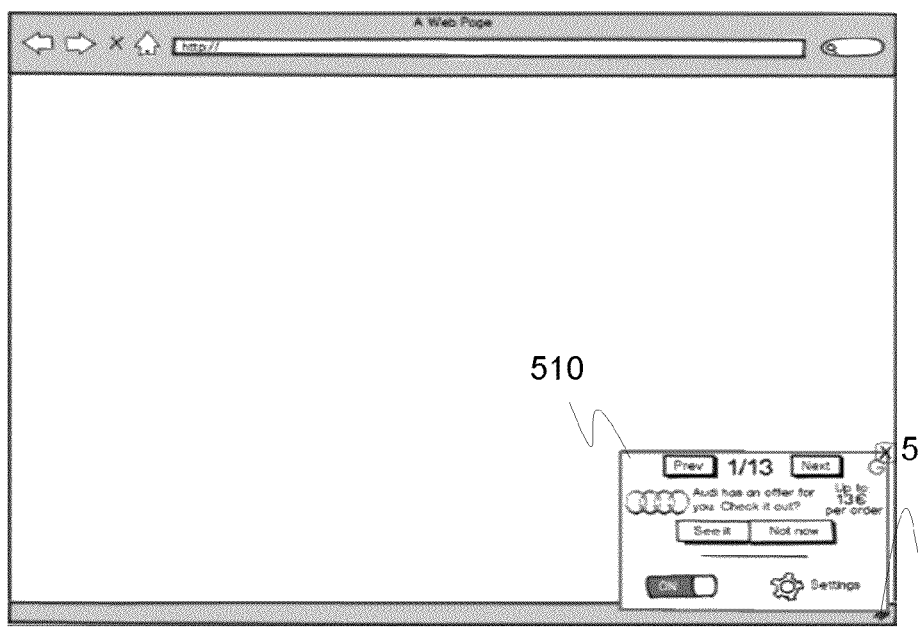
FIG. 5d is a still a further example of a browser-based UI and especially notification visuals.

FIG. 5d is a still a further example of a browser-based UI and particularly notification visuals. Generally, e.g. browser window's or other application window's periphery or 'tool bar' region may be provided with an indication 510b of the status of the suggested arrangement via an icon, for example. In the shown view 508, a visual notification 510 has been provided to the user regarding a content offer as an enlarged notification window or sub-window essentially at the location of the status indicator and substantially covering it near the periphery of the browser window.

Accordingly, the user may easily react to the notification by selecting the icons ('buttons') embedded therein, but the notification does not disturb the user. Preferably, the notification will automatically disappear e.g. after a predetermined period in case of no associated user actions indicative of positive interest towards the notification (e.g. pointer hovering above it) are detected. Rejecting the content proposal may cause the notification to disappear immediately and related information to be transferred in the background either right away or in a delayed fashion to the remote arrangement for analysis and profiling purposes. Accepting the proposal may instruct the terminal application such as browser to access the content such as the web site of the content provider, e.g. advertiser. The related icon may be thus associated with a link to access the suggested content in addition to other actions.

Figure 5E:
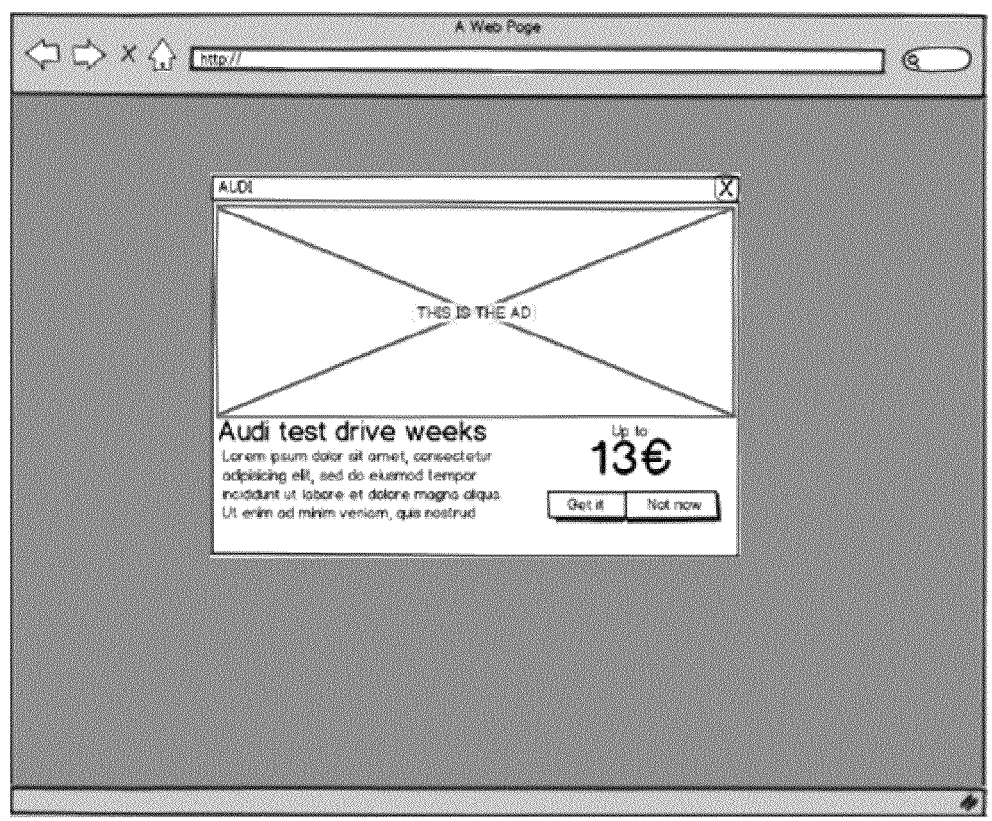
FIG. 5e is a further example of a browser-based UI and especially notification visuals.

FIG. 5e is a further example of a browser-based UI and especially notification visuals illustrating a scenario 512 wherein the user has acknowledged his/her initial interest in the notified content by clicking a corresponding icon or other selection action, for instance. Instead of directly forwarding the user to the content provider—specific environment such as web site, a further information element, essentially a data window, has been shown to provide additional information, such as possible monetary reward, about the content on the basis of which the user may then continue to the content-provider environment, postpone accessing the content (indication of which may be still stored to the personal media profile for easy future access), and/or discard the content by activating a proper UI element such as icon.

Figure 6:
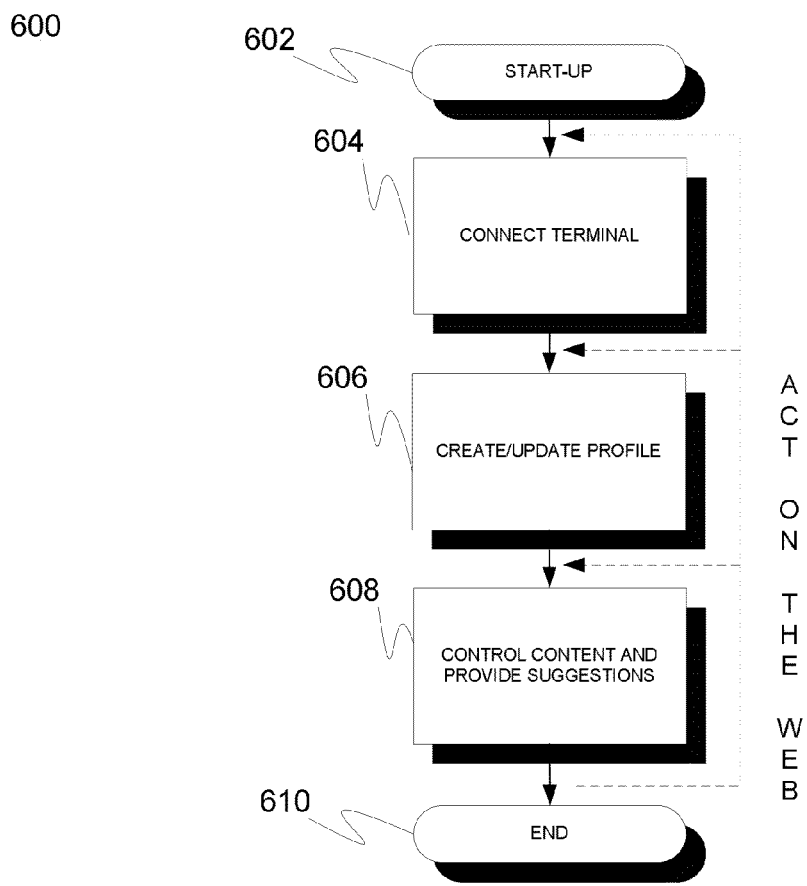
FIG. 6 is a flow diagram of an embodiment of a method in accordance with the present invention.

FIG. 6 is a flow diagram of an embodiment of a method in accordance with the present invention for user privacy retaining profiling and content provision to be performed by an electronic arrangement, such as one or more at least functionally connected electronic devices like terminal(s) and at least one server optionally provided in a cloud environment. At method start-up 602, the necessary equipment such as terminal device and server arrangement may be acquired, configured, provided with necessary software, etc. In other words, typical preparatory actions may take place. The server may be configured to co-operate with external services and servers such as an affiliate network for acquiring information about available content to be suggested to suitable (profiled) users.

At 604, a terminal device such as a computer, smartphone, tablet or more unconventional terminal device such as smart sunglasses or key as explained hereinbefore is connected (authenticated) to the remote arrangement. The terminal may be associated dynamically with a new or existing media profile of the user of the terminal by means of profile-identifying data provided to the arrangement. Association may take place upon receipt of said profile-identifying but preferably user identity-protecting anonymous data from the terminal, such as a numeric or alphanumeric, optionally encrypted, code. The code or other media profile—identifying data may be transferred utilizing a terminal-side application such as browser extension application.

At 606, the adjustable personal media profile is established or updated. The personal media profile describes the user's interests preferably excluding identifiable information, optionally name and/or e-mail, wherein the interests are represented on a number of levels including interest categories, such as automotive or travel categories, and further wherein the interests are at least partially determined based on monitoring the user behavior relative to the web.

At 608, while the user is acting on the web such as performing 'surfing' (accessing e.g. web pages), online tracking and content provision, such as ad playback, is controlled in accordance with the personal media profile, and the user may be provided with notifications indicative of content suggestions conforming to the personal media profile. When the user accesses various online services, personal media profile data is selectively, preferably user-controllably, transferred between the personal media profile and the online service to exchange user interests-describing data between these such that the service lacks direct access to the full personal media profile of the user (unless the user desires otherwise, in which case the user may optionally allow full profile data to be transferred to the external entity).

At 610, the method execution is ended.

As being indicated in the figure by the dotted feedback arrows, the execution of method items may be repeated. For example, different actions on the web by the user may cause performing intermittent updates to the media profile or a different terminal may be connected to the profile. Also the mutual ordering of the shown items may be varied as naturally after establishing a profile with a first terminal, a second terminal may be connected thereto (however, preferably not for simultaneous access of the same profile as explained herein for preserving the user identity).

Figure 7:
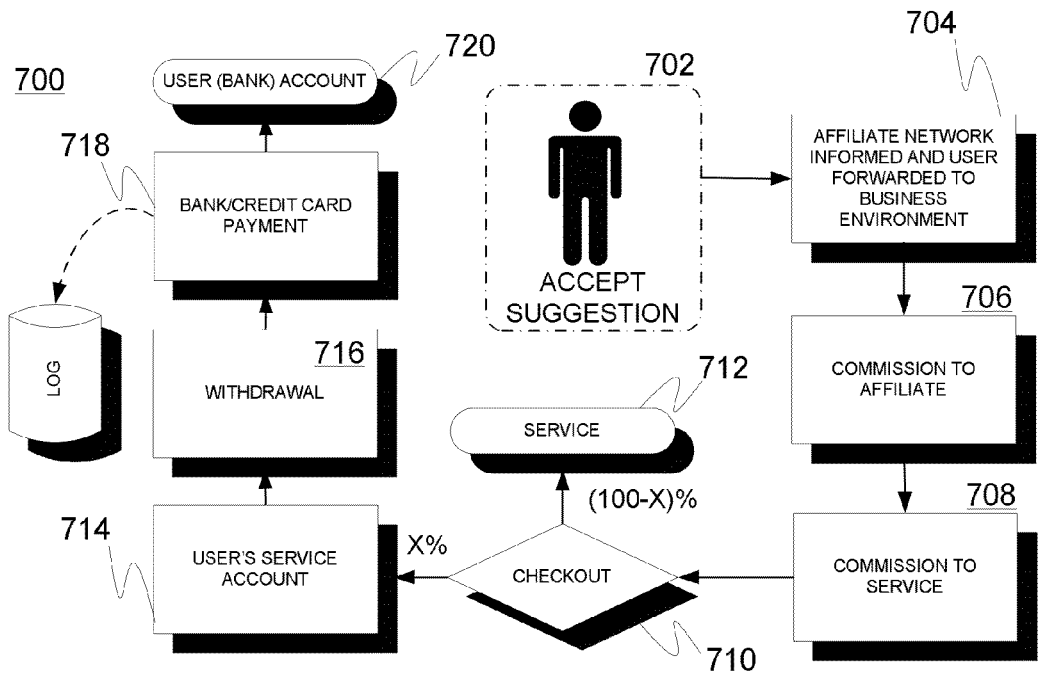
FIG. 7 is a flow diagram of an embodiment of financial reward recovery method in accordance with the present invention.

FIG. 7 is a flow diagram of an embodiment of reward recovery method in accordance with the present invention.

At 702, the user is provided with a content suggestion such as suggestion to see an ad. The user is willing to follow the lead and reacts accordingly (e.g. selects an icon 'I want to see the content' on the UI).

At 704, the arrangement offering the media profiling and content provision service in accordance with the present invention informs affiliate network tracker(s) about the event and the user is forwarded to the target business (content provider) environment, where the user is provided with the content etc.

Based on a successful content provision, the business provides a commission, or 'reward', to the affiliate network at 706, and the affiliate network provides a share to the operator of the service provided by the arrangement at 708.

At checkout 710 the arrangement receives the payment and leaves an agreed share such as 50% to the service (operator) account 712 and the remaining 50% to the particular user's account 714.

The user account is where the funds/rewards are typically stored for the user until e.g. one of the following criteria is met:
the user withdraws at least portion of the funds,
the user executes in-app purchase, or
the user account (media profile) has no activity for a predetermined period such as a year, whereupon the account is closed and the funds are sent to the operator account in accordance with the use terms of the service.

In the service UI a dedicated portion such as 'my rewards' type of a web page may be provided to enable inspecting the virtual funds/wallet and execute related actions such as withdrawal or more generally, recovery of the reward. As noted herein earlier, in-app purchases using the virtual funds may be possible.

Withdrawal 716 of funds from the user account may proceed as follows:
1. The user provides his/her payment information (bank account/credit card account)
2. The money is transferred 718 from the user account and paid to the chosen location 720 (transaction fees may be subtracted from the user).

The performed actions may be logged in a number of log files.

Alternatively, the user may use the rewards in his/her user account to obtain new services (apps, access to content, etc.) directly—thus potentially skipping additional costs such as VAT (Value Added Tax) when legally applicable.

To protect the user's identity during financial transactions and e.g. withdrawal of funds, an accredited third party service may be utilized. In case of legal requirements (to prevent money laundry etc.) necessitating disclosing true identity of transaction parties, the user could thus only identify himself/ herself to the third party service under heavy scrutiny instead of the overall media profiling arrangement.

Figure 8:
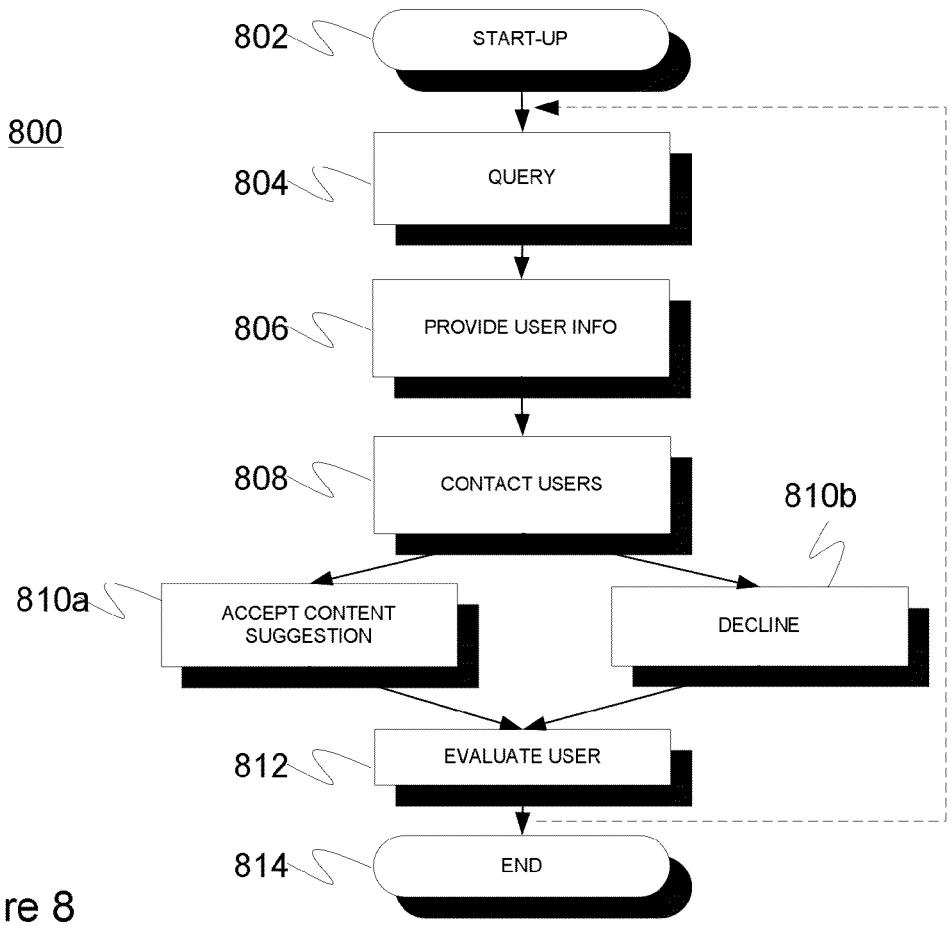
FIG. 8 is a flow diagram of an embodiment of a targeted marketing and content provision method in accordance with the present invention.

FIG. 8 is a flow diagram of an embodiment of beneficial customer analysis and targeted marketing or generally content provision method in accordance with the present invention.

At method start-up, item 802 may imply e.g. a marketing decision by an external entity such as a business/content provider. At this stage, the business may decide the number and/or nature of users they want to reach, for instance. The nature may be defined explicitly and/or by means of implicit criteria, through characterization of the content to be delivered, product to be marketed, etc.

At 804, a query on a user register is forwarded to the arrangement offering the user profiling, profile management and content provision service in accordance with the present invention. Indeed, e.g. a business typically wants to reach users/customers that are interested in their business and related services/products. The arrangement according to the present invention provides accurate user profiling in accordance with the explicit and/or implicit criteria preferably provided by the business, which may then obviously help finding the most potential users/customers for the business.

At 806, the arrangement determines the most potential users and provides the external entity such as business with related register data, which may contain preferably anonymous contact information such as temporary e-mail addresses and/or other applicable communication/message exchange channel described earlier. The business makes a payment on the received register of which the service provider may collect e.g. 50% and the targeted users may share the remaining amount among other numerous possible income sharing policies.

At 808, the business contacts the users/customers via received contact information such as temporary e-mail addresses and/or other identifiers managed by the arrangement. Alternatively or additionally, the arrangement may contact the users in accordance with the criteria and optional other conditions set by the business preferably already in the query.

At 810a and 810b, a user/customer receives a notification on the suggested content e.g. via a web browser or native media profile/wallet application.

At 810a the user accepts the content suggestion and is therefore provided with the content from the business, such as an advertisement. At 810b, the customer declines the suggested content and will therefore not be provided with content from the business. The arrangement provides accurate and dynamically evolving user profiling, which becomes even more accurate over time when a user interacts with data services (and more input data for profiling is thus gathered), which may also generally decrease the rejection rate for content suggestions. The arrangement may therefore provide a sophisticated tool for content providers/businesses to find customers interested in their business.

At 812, user/customer value towards a business/content provider is evaluated. Analyzing algorithms will assess the user's behavior and update the user's rating and/or profile. As an illustrating example, when a user accepts a content suggestion as in 810a his/her rating improves and/or profile adapts relative to the suggested content and when declining on a content suggestion as in 810b the rating degrades and/or profile again adapts relative to the suggested content. Data software may provide far more complex analyzing algorithms, which may take into account the consistency of a user's behavior, such as content approvals and declines, towards businesses/content providers, which will be understood by a skilled person and therefore improving the rating on most valuable users/customers. A general rating may be provided for each user. The general rating may reflect the consistency of his/her reactions towards content and/or related activity/passivity (reacts/does not generally react to any content suggestions).

The user/customer evaluation at 812 may also be utilized to benefit users. The payment or generally incentive amount, e.g. 50% of the total payment, shared amongst the users may be divided on the basis of user ratings, following e.g. a Gaussian curve distribution. The arrangement according to the invention may, thus, provide a fairer bonus system, which may enhance activity amongst users hence, leading to greater content suggestion approval percentage.

The dotted feedback arrow in FIG. 8 indicates the potentially recurring nature of the procedure. When the arrangement receives a new query as in 804, the arrangement may provide a register with up-to-date contact information representing the most valuable customers according to the prevailing situation (profiles, ratings, etc.).

At 814, the method execution is ended.

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention. For instance, in some embodiments a user may, in addition to accepting content offers, obtain funds or receive new rewards among other incentives at the media profile account by providing product/service suggestions to his/her contacts and thus indirectly act as an amateur sales representative. For example, a user that considers himself an expert on mountain bikes, may provide data, i.e. a user-initiated content suggestion, regarding a nice bike to his contact via the arrangement of the present invention. In case the contact accepts the content suggestion, the content provider may issue a commission to the user. The content suggestion may be thus addressed to another media profile registered or outside the service operated by the arrangement e.g. via e-mail or SMS (Short Message Service)/MMS (Multimedia Messaging Service) messaging, for example, optionally incorporating a link forwarding the recipient to the content provider's business environment such as a web site and preferably identifying the suggesting user.

Further, in some embodiments the present solution could be utilized for everyday and substantially real-time financial transactions in which the terminal associated with a media profile and related virtual money wallet/reward repository could be somewhat seamlessly applied to trigger a payment towards the recipient's account. The terminal could apply e.g. a wireless identification means such as an NFC (Near-Field Communication) reader or transceiver to obtain payment instructions (recipient account details, sum, reference code, etc.) from a nearby compatible device such as NFC transceiver-provided cash register or other payment equipment at a grocery store, whereupon the terminal could forward the instructions to the network aspect of the arrangement in accordance with the present invention for continuing the payment procedure optionally via an external payment service. The store could then monitor the payment/account status in real-time fashion and acknowledge the payment when becoming visible.

Still, in some embodiments, the logical entities of the presented arrangement such as the media profile, authentication and media control entities may be substantially realized or hosted by one device, such as a terminal device or a network server, alone or by a combination of multiple devices such as at least one network server, or other corresponding network entity, and a terminal device communicating therewith. A device belonging to the arrangement may implement a portion of the media profile entity, authentication entity and/or media control entity such that at least one further device implements the remaining portions. Alternatively, several devices could be configured to implement at least partially overlapping entities and related functionalities e.g. for load balancing and/or elevating system reliability.

The invention claimed is:

1. An electronic system comprising:
   a computer device having a memory that provides
      a media profile entity configured to store and maintain at least one user-adjustable personal media profile for a user capable of accessing a network, and related sites, services and/or applications via a number of terminal devices, wherein the personal media profile describes the user's interests preferably excluding identifiable information, and wherein the interests are represented on a number of levels including interest categories and further wherein the interests are at least partially determined based on monitoring the user behavior relative to the network,
      an authentication entity configured to associate a terminal utilized by the user with the media profile of the user based on profile-identifying code provided by the terminal, said code being anonymous, and
      a media control entity configured to allow and block online tracking and content provision in accordance with the personal media profile, wherein the user is provided with a number of notifications indicative of content suggestions conforming to the personal media profile via the terminal, and wherein personal media profile data is selectively, preferably user-controllably, transferred between the personal media profile and an external entity accessed in order to exchange user interests-describing data between the personal media profile and the external entity, wherein said external entity lacks direct access to the full personal media profile of the user,
   wherein the profile-identifying code for associating the terminal with the personal media profile is anonymous data excluding personally identifiable information, including name or e-mail, and comprises or is at least based on a user-selected or machine-created anonymous code preferably comprising a plurality of letters, numbers and/or symbols.

2. The electronic system of claim 1, configured to exchange the user's media profile data or data utilized for such profiling with the external entity via at least virtual intermediate entity, preferably being established dynamically, where said intermediate entity defines rules for media profile data access regarding the particular external entity and the user.

3. The electronic system of claim 1, wherein notification includes at least one element selected from the group consisting of: product information, service information, game information, link to a service, link to a web site, advertisement, offer, information regarding an internet event, and information regarding a real-life event.

4. The electronic system of claim 1, configured to host a network service for providing user access to the stored media profiles and further providing a UI (user interface) for manually adjusting the related data including the user interests.

5. The electronic system of claim 1, configured to provide a user interface enabling the user to alter the relevance of an interest or delete the interest completely regarding the personal media profile.

6. The electronic system of claim 1, configured, in order to create or update the personal media profile, to utilize at least one element selected from the group consisting of: visited web site or page, activated link or other object, performed game action, constructed game-related profile, utilized search criterion such as including search terms, message written, message received, rating or vote given, time used with a web site or page, time used with a service, social contact, group membership, message sender, and message recipient.

7. An electronic system comprising:
a computer device having a memory that provides a media profile entity configured to store and maintain at least one user-adjustable personal media profile for a user capable of accessing a network, and related sites, services and/or applications via a number of terminal devices, wherein the personal media profile describes the user's interests preferably excluding identifiable information, and wherein the interests are represented on a number of levels including interest categories and further wherein the interests are at least partially determined based on monitoring the user behavior relative to the network,
an authentication entity configured to associate a terminal utilized by the user with the media profile of the user based on profile-identifying code provided by the terminal, said profile-identifying code being anonymous,
and a media control entity configured to allow and block online tracking and content provision in accordance with the personal media profile, wherein the user is provided with a number of notifications indicative of content suggestions conforming to the personal media profile via the terminal, and wherein personal media profile data is selectively, preferably user-controllably,
transferred between the personal media profile and an external entity accessed in order to exchange user interests-describing data between the personal media profile and the external entity, wherein said external entity lacks direct access to the full personal media profile of the user, and configured to initially utilize a default set of profile data elements of the personal media profile to be shared with external entities, wherein the default set is adjustable by the user.

8. The electronic system of claim 1, configured to control the visual representation of a notification to appear at the border region of the user interface as a visually distinguishable and temporally limited entity.

9. The electronic system of claim 1, wherein notification comprises a selectable object associated with a link to the suggested content or further information regarding the content.

10. The electronic system of claim 1, comprising a back-up entity enabling the user to back up at least portion of personal media profile to an external service or hardware.

11. An electronic system comprising: a computer device having a memory that provides a media profile entity configured to store and maintain at least one user-adjustable personal media profile for a user capable of accessing a network, and related sites, services and/or applications via a number of terminal devices, wherein the personal media profile describes the user's interests preferably excluding identifiable information,
and wherein the interests are represented on a number of levels including interest categories and further wherein the interests are at least partially determined based on monitoring the user behavior relative to the network,
an authentication entity configured to associate a terminal utilized by the user with the media profile of the user based on profile-identifying code provided by the terminal, said code being anonymous,
and a media control entity configured to allow and block online tracking and content provision in accordance with the personal media profile, wherein the user is provided with a number of notifications indicative of content suggestions conforming to the personal media profile via the terminal, and wherein personal media profile data is selectively, preferably user-controllably, transferred between the personal media profile and an external entity accessed in order to exchange user interests-describing data between the personal media profile and the external entity, wherein said external entity lacks direct access to the full personal media profile of the user, and configured to host a reward repository for the user containing funds or other rewards the user has gained by accessing the suggested content, wherein the electronic system is preferably further configured to transfer funds to the user via an external payment service.

12. The electronic system of claim 1, configured to determine preferably user-observable statistics regarding the user's behavior and preferences, optionally including a ranking of the user interests.

13. The electronic system of claim 1, configured to apply a multi-level interest hierarchy defining a plurality of higher-level interest categories and more specific interests associated with the categories.

14. The electronic system of claim 1, comprising the terminal.

15. The electronic system of claim 1, comprising at least one server hosting at least part of said media profile and optionally control entities, and at least one terminal client device provided with application logic configured to communicate with said at least one server.

16. The electronic system of claim 1, comprising at least one server hosting at least part of said media profile and optionally control entities, and at least one terminal client device provided with application logic configured to communicate with said at least one server, wherein the terminal is provided with an authentication entity for non-anonymous and local authentication of the user relative to the terminal and/or application logic.

17. An electronic system comprising: a computer device having a memory that provides -a media profile entity configured to store and maintain at least one user-adjustable personal media profile for a user capable of accessing a network,
and related sites, services and/or applications via a number of terminal devices, wherein the personal media profile describes the user's interests preferably excluding identifiable information, and wherein the interests are represented on a number of levels including interest categories and further wherein the interests are at least partially determined based on monitoring the user behavior relative to the network, -an authentication entity configured to associate a terminal utilized by the user with the media profile of the user based on profile-identifying code provided by the terminal, said code being anonymous,
and a media control entity configured to allow and block online tracking and content provision in accordance with the personal media profile, wherein the user is provided with a number of notifications indicative of content suggestions conforming to the personal media profile via the terminal, and wherein personal media profile data is selectively, preferably user-controllably, transferred between the personal media profile and an external entity accessed in order to exchange user interests-describing data between the personal media profile and the external entity, wherein said external entity lacks direct access to the full personal media profile of the user, and configured to manage personal media profiles for a plurality of users, receive a query from an external entity requesting a number of target users for content delivery, said query indicating a number of selection criteria, and determine the target users among the plurality of users based on the criteria and personal media profiles of said plurality of users.

18. The electronic system of claim 1, configured to allocate a temporary e-mail ad-dress, chat or other applicable messaging channel for a user with a personal media profile to enable external entity to address content thereto.

19. A method for user privacy-preserving profiling and content provision to be performed by an electronic system, said method comprising establishing a user-adjustable personal media profile for a user capable of accessing a network and related sites, services and/or applications via a number of terminal devices, wherein the personal media profile describes the user's interests preferably excluding identifiable information, and wherein the interests are represented on a number of levels including interest categories, and further wherein the interests are at least partially determined based on monitoring the user behavior relative to the network, and controlling online tracking and content provision, optionally advertising, in accordance with the personal media profile, wherein the user is provided with notifications indicative of content suggestions conforming to the personal media profile utilizing a terminal associated with the media profile, and wherein personal media profile data is selectively, preferably user-controllably, transferred between the personal media profile and external entity, optionally web site, accessed to exchange user interests-describing data between the personal media profile and the external entity, wherein the external entity lacks direct access to the full personal media profile of the user, wherein profile-identifying code for associating the terminal with the personal media profile is anonymous data excluding personally identifiable information, including name or e-mail, and comprises or is at least based on a user-selected or machine-created anonymous code preferably comprising a plurality of letters, numbers and/or symbols.

20. The method of claim 19, wherein the terminal is dynamically associated with the media profile of the user upon receipt of the profile-identifying code from the terminal, including a numeric or alphanumeric, optionally encrypted, code.

21. The method of claim 19, where in response to detecting an accepted content suggestion, the user is directed to access the content and an associated affiliate network is optionally informed.

22. A computer program product embodied on a non-transitory readable medium, comprising program code adapted, when run on a computer, to execute the method comprising establishing a user-adjustable personal media profile for a user capable of accessing a network and related sites, services and/or applications via a number of terminal devices, wherein the personal media profile describes the user's interests preferably identifiable information, and wherein the interests are represented on a number of levels including interest categories, and further wherein the interests are at least partially determined based on monitoring the user behavior relative to the network, and controlling online tracking and content provision, optionally advertising, in accordance with the personal media profile, wherein the user is provided with notifications indicative of content suggestions conforming to the personal media profile utilizing a terminal associated with the media profile, and wherein personal media profile data is selectively, preferably user-controllably, transferred between the personal media profile and external entity, optionally web site, accessed to exchange user interests-describing data between the personal media profile and the external entity, wherein the external entity lacks direct access to the full personal media profile of the user, wherein profile-identifying code for associating the terminal with the personal media profile is anonymous data excluding personally identifiable information, including name or e-mail, and comprises or is at least based on a user-selected or machine-created anonymous code preferably comprising a plurality of letters, numbers and/or symbols.

23. The method of claim 19, wherein the method initially utilizes a default set of profile data elements of the personal media profile to be shared with external entities, wherein the default set is adjustable by the user.

24. The method of claim 19, wherein the method hosts a reward repository for the user containing funds or other rewards the user has gained by accessing the suggested content, wherein the arrangement is preferably further configured to transfer funds to the user via an external payment service.

25. The method of claim 19, wherein the method manages personal media profiles for a plurality of users, receive a query from an external entity requesting a number of target users for content delivery, said query indicating a number of selection criteria, and determine the target users among the plurality of users based on the criteria and personal media profiles of said plurality of users.

26. The computer program product embodied on a non-transitory readable medium of claim 22, wherein the method initially utilizes a default set of profile data elements of the personal media profile to be shared with external entities, wherein the default set is adjustable by the user.

27. The computer program product embodied on a non-transitory readable medium of claim 22, wherein the method hosts a reward repository for the user containing funds or other rewards the user has gained by accessing the suggested content, wherein the arrangement is preferably further configured to transfer funds to the user via an external payment service.

28. The computer program product embodied on a non-transitory readable medium of claim 22, wherein the method manages personal media profiles for a plurality of users, receive a query from an external entity requesting a number of target users for content delivery, said query indicating a number of selection criteria, and determine the target users among the plurality of users based on the criteria and personal media profiles of said plurality of users.

* * * * *